W. C. BOOZ & L. LOSURE.
SPRAYER.
APPLICATION FILED NOV. 8, 1911.
1,057,616.
Patented Apr. 1, 1913.
2 SHEETS—SHEET 2.
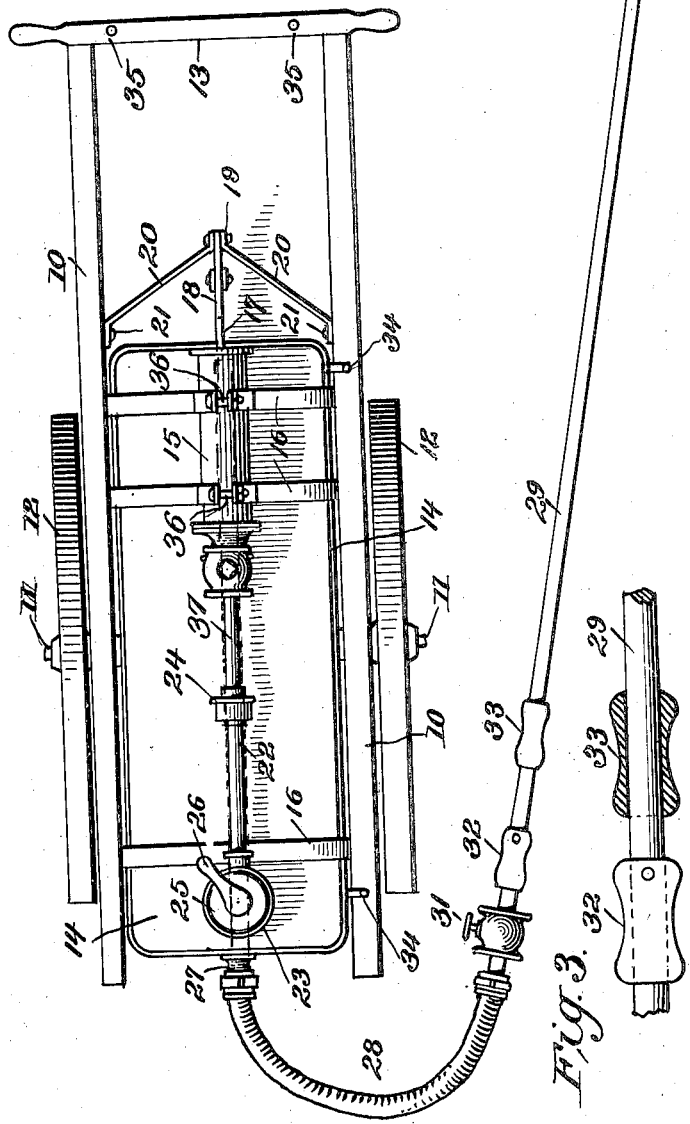
Witnesses
Edward P. Rea.
Juana M. Tellin.
Inventors
W. C. Booz
L. Losure
By A. R. Stacy, Attorney.

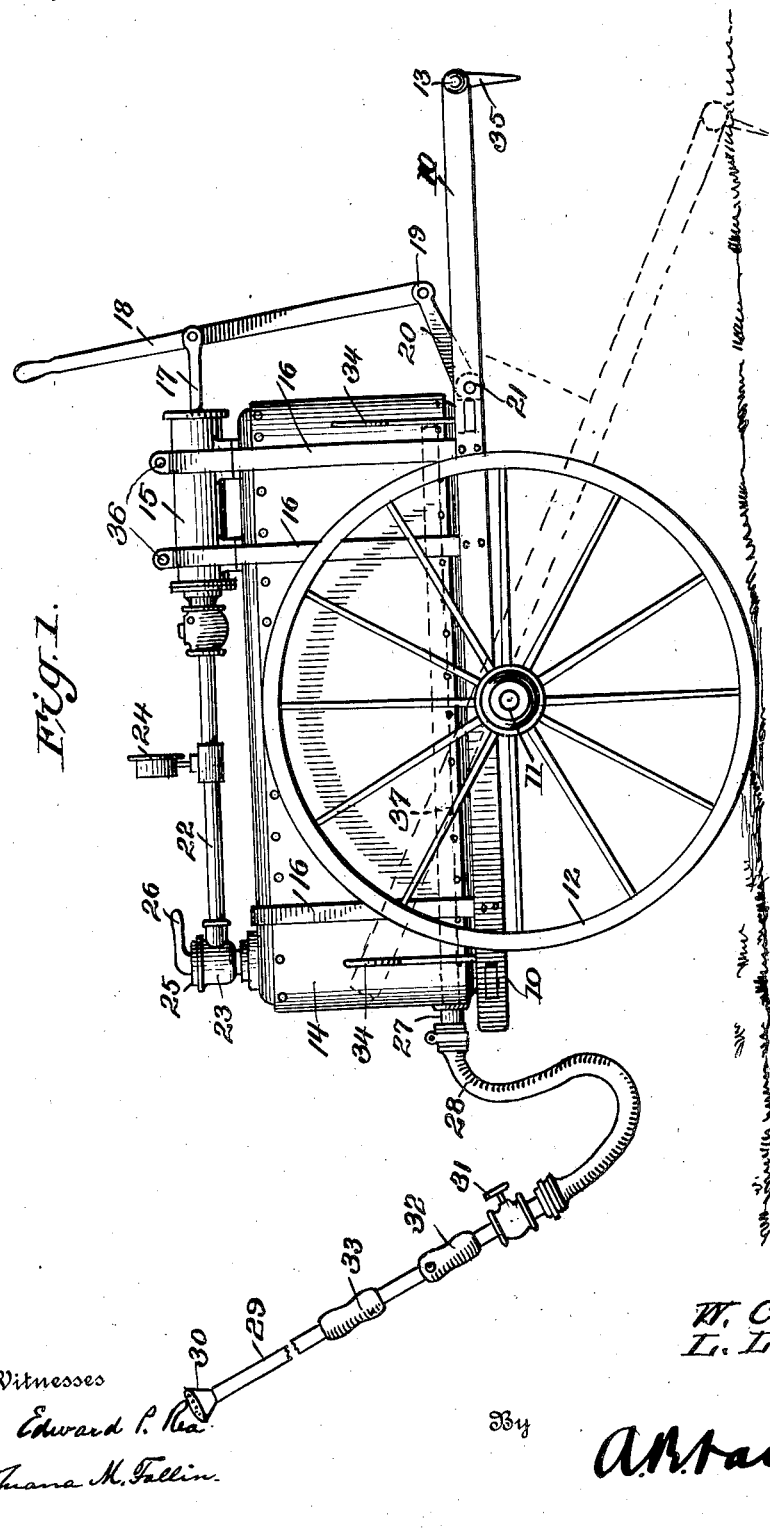

UNITED STATES PATENT OFFICE.

WILLIAM C. BOOZ AND LISANDER LOSURE, OF VAN BUREN, INDIANA, ASSIGNORS, BY DIRECT AND MESNE ASSIGNMENTS, TO LOSURE SPRAY MFG. CO., OF VAN BUREN, INDIANA.

SPRAYER.

1,057,616.  Specification of Letters Patent.  Patented Apr. 1, 1913.

Application filed November 8, 1911. Serial No. 659,231.

*To all whom it may concern:*

Be it known that we, WILLIAM C. BOOZ and LISANDER LOSURE, citizens of the United States, residing at Van Buren, in the county of Grant and State of Indiana, have invented certain new and useful Improvements in Sprayers, of which the following is a specification.

This invention relates to improvements in sprayers employed for spraying trees, shrubbery and the like, and has for its object to improve the construction and increase the efficiency and utility of devices of this character.

Another object of the invention is to provide a device of this character including a tank for the spraying liquid mounted to swing upon suitable carrier wheels so that the tank may be agitated to thoroughly mix the contents and provided with an air pump whereby compressed air may be supplied to the tank to force the liquid therefrom and with means for holding the tank stationary during the pumping action.

With these and other objects in view, the invention consists in certain novel features of construction as hereafter shown and described, and then specifically pointed out in the claims, and in the drawings illustrative of the preferred embodiment of the invention: Figure 1 is a side elevation of the improved apparatus; Fig. 2 is a plan view of the same; Fig. 3 is an enlarged sectional detail of the grip device of the spray pipe.

Corresponding and like parts are referred to in the following description and indicated in all the views of the accompanying drawings by the same reference characters.

The improved device comprises a supporting frame 10, preferably oblong, and mounted upon an axle 11 having carrier wheels 12 and with a transverse handle 13 at one end. The major portion of the frame 10 is located rearwardly or at the handle end of the frame, and mounted upon the carrier frame is a tank 14 of any suitable material and of any suitable size, but preferably of sheet or plate metal. The tank is located at the opposite end of the frame to the handle 13 and is thus supported substantially midway its ends upon the axle of the wheels 12. Mounted upon the tank 14 is an air pump 15, the pump being preferably located at the rear end of the tank so that its weight is borne rearwardly of the axle. The tank and the pump are retained in position by clamp bolts 36 or other suitable fastening devices and preferably by utilizing the straps 16 for receiving the bolts, as shown. The pump 15 is provided with the usual piston whose rod 17 is arranged to be actuated by an operating lever 18, the latter being pivoted at 19 to a link 20 leading from the frame 10 and pivoted at 21 thereto. It will be noted that the operating lever 18 is located at a point convenient to the handle 13, so that the operator can support the tank by the handle 13 and rapidly agitate the tank by the tilting movement upon its axle while at the same time actuating the lever 18 with the other end, as hereafter more fully described.

Leading from the cylinder of the pump 15 is a discharge pipe 22 connected into a T 23 which in turn leads into the tank 14. A pressure gage 24 is connected into the pipe 22 to enable the operator to control the pressure in the tank.

The T-member 23 is provided with a detachable plug 25, preferably provided with an operating lever 26 to provide simple and convenient means for charging the tank. Leading from the tank 14 preferably near its bottom, is a hose nipple 27 to receive a section of discharge hose 28, the inner end of the nipple being connected to a pipe, indicated at 37, which extends entirely through the interior of the tank longitudinally and terminates near the rear end and at its lowest point, whereby the discharge of the tank is located at the farthest possible point from its intake. Connected to the discharge end of the hose 28, is a spray pipe 29 having a spray nozzle 30 at its free end and provided with a controlling valve 31. Connected rigidly to the pipe 29, preferably near the hose connection 28, is a hand grip 32, and slidably arranged upon the pipe 29 is another similar hand grip 33. Supporting hooks 34 are preferably provided upon the frame 10 to support the pipe 29 when not in use.

Projecting downwardly from the handle 13 are spurs 35 adapted to be forced into the ground to hold the frame 10 and the tank in stationary position when first charging the tank with compressed air. When thus employing the device the operator forces the spurs into the ground and holds the handle in its depressed position with one foot while actuating the pump. Thus the operator is free to employ both hands when operating the pump, which thus materially expedites the action as will be obvious. The co-action of the spurs, handle and frame is thus an important feature of the device and materially facilitates the operation and increases the utility.

After the tank has been once charged and vigorously vibrated to thoroughly mix the contents, the operator then manipulates the spray pipe, the stationary hand grip 32 and the movable hand grip 33 materially facilitating the convenience of the action, and enabling the operator to readily move the nozzle end of the spray into any required position and without imparting unnecessary friction to the hands, as the friction of the movement is confined almost entirely between the slidable handle 33 and the pipe 29.

The improved device may be constructed of any required size and may be of any suitable material and employed for projecting any of the various spray compounds employed.

Having thus described the invention, what is claimed as new is:

1. In a sprayer, an axle, bearing wheels carried by the axle, a frame mounted for swinging movement on the axle, a supply tank mounted on the frame and centrally over the axle, a pipe extending from a point exterior of the tank through the forward end of the tank and terminating adjacent the rear end of the tank, means for supplying air under pressure to the tank, a handle carried by the rear end of the frame, and spurs carried by the handle and adapted to engage in the ground when the frame is swung to tilt the tank and to hold the frame and tank in inclined position with its rear end lowermost.

2. In a sprayer, a supporting frame including spaced side members connected at one end by a handle, prongs carried by the handle and adapted for engagement in the ground, a tank mounted upon that end of the frame opposite the handle, means including a pump having a piston rod for forcing air into said tank, a lever pivoted intermediate its length to the free end of the piston rod, a pair of links, each of said links pivoted at one end to a side member of the frame and at its other end to one end of the said lever, and a discharge pipe leading from said tank.

In testimony whereof we affix our signatures in presence of two witnesses.

WILLIAM C. BOOZ. [L. S.]
LISANDER LOSURE. [L. S.]

Witnesses:
ALFRED HOGSTON,
GUY DUCKWALL.